US007411686B2

(12) United States Patent
Rafac

(10) Patent No.: US 7,411,686 B2
(45) Date of Patent: Aug. 12, 2008

(54) METHODS AND APPARATUS FOR ALIGNING AN ETALON WITH A PHOTODIODE ARRAY

(75) Inventor: Robert J. Rafac, Encinitas, CA (US)

(73) Assignee: Cymer, Inc., San Diego, CA (US)

( * ) Notice: Subject to any disclaimer, the term of this patent is extended or adjusted under 35 U.S.C. 154(b) by 149 days.

(21) Appl. No.: 11/452,501

(22) Filed: Jun. 14, 2006

(65) Prior Publication Data

US 2007/0291279 A1   Dec. 20, 2007

(51) Int. Cl.
G01B 9/02 (2006.01)
G01J 3/45 (2006.01)
(52) U.S. Cl. ..................... 356/519; 356/454
(58) Field of Classification Search ............... 356/519, 356/454
See application file for complete search history.

(56) References Cited

U.S. PATENT DOCUMENTS

| 5,161,165 | A * | 11/1992 | Zorabedian ............ 372/20 |
| 6,539,046 | B2 | 3/2003 | Newman et al. .......... 372/98 |
| 6,603,549 | B2 | 8/2003 | Haas et al. ............. 356/326 |
| 6,713,770 | B2 | 3/2004 | Sandstrom et al. ........ 250/372 |
| 6,717,965 | B2 * | 4/2004 | Hopkins et al. ............ 372/20 |
| 6,750,972 | B2 | 6/2004 | Sandstrom et al. ........ 356/454 |
| 6,894,785 | B2 | 5/2005 | Rao et al. ................ 356/450 |
| 6,912,052 | B2 | 6/2005 | Rao et al. ................ 356/451 |
| 6,952,267 | B2 | 10/2005 | Rafac .................... 356/454 |
| 7,009,716 | B2 * | 3/2006 | Kim et al. ................ 356/519 |
| 7,136,169 | B2 * | 11/2006 | Sandstrom ............... 356/519 |
| 2004/0263844 | A1 | 12/2004 | Rafac .................... 356/326 |
| 2004/0263861 | A1 | 12/2004 | Rafac .................... 356/519 |
| 2005/0286599 | A1 | 12/2005 | Rafac et al. .............. 372/55 |

OTHER PUBLICATIONS

U.S. Appl. No. 11/091,005, filed Mar. 25, 2005, Newman et al.
U.S. Appl. No. 11/260,929, filed Oct. 27, 2005, Melchior.

* cited by examiner

Primary Examiner—Patrick Connolly
Assistant Examiner—Jonathan Skovholt
(74) Attorney, Agent, or Firm—Matthew K. Hillman

(57) ABSTRACT

A method and apparatus are disclosed for measuring a characteristic, e.g. spectral bandwidth, of a light beam. The apparatus may comprise an etalon for generating an interference pattern having at least one light cone, an arrangement of detector elements, the arrangement receiving a portion of the light cone and producing a signal indicative of the characteristic; and an auxiliary detector positioned to receive a portion of the light cone and produce a signal indicative of an alignment between the etalon and the linear arrangement.

20 Claims, 3 Drawing Sheets

METHODS AND APPARATUS FOR ALIGNING AN ETALON WITH A PHOTODIODE ARRAY

CROSS-REFERENCE TO RELATED APPLICATIONS

The present application is related to co-pending U.S. patent applications Ser. No. 11/260,929, entitled BLISTER RESISTANT OPTICAL COATING, filed on Oct. 27, 2005; co-pending U.S. patent applications Ser. No. 09/931,726, entitled CONVOLUTION METHOD FOR MEASURING LASER BANDWIDTH, filed on Aug. 16, 2001; Ser. No. 10/609,223, entitled METHOD AND APPARATUS FOR MEASURING BANDWIDTH OF AN OPTICAL OUTPUT OF A LASER, filed on Jun. 26, 2003; Ser. No. 10/789,328, entitled IMPROVED BANDWIDTH ESTIMATION, filed on Feb. 27, 2004; Ser. No. 11/091,005, entitled WAVEMETER FOR GAS DISCHARGE LASER, filed on Mar. 25, 2005; and U.S. Pat. No. 6,952,267, entitled METHOD AND APPARATUS FOR MEASURING BANDWIDTH OF A LASER OUTPUT, issued on Oct. 4, 2005; U.S. Pat. No. 6,912,052, entitled GAS DISCHARGE MOPA LASER SPECTRAL ANALYSIS MODULE, issued on Jun. 28, 2005; U.S. Pat. No. 6,894,785, entitled GAS DISCHARGE MOPA LASER SPECTRAL ANALYSIS MODULE, issued on May 17, 2005; U.S. Pat. No. 6,713,770, entitled HIGH RESOLUTION SPECTRAL MEASUREMENT DEVICE, issued on Mar. 30, 2004, the disclosures of which are hereby incorporated by reference.

FIELD OF THE INVENTION

The present invention relates primarily to spectrometers having an etalon and a photodiode array for measuring the wavelength and/or spectral bandwidth of a laser system output beam.

BACKGROUND OF THE INVENTION

Discharge lasers, especially excimer lasers, are being increasingly used in the photolithographic manufacture of semiconductor devices. As projection lens technology has advanced, the requirements on the control of the laser light output have increased. For example, variations in the output power, central wavelength and wavelength spectrum of a laser source must be minimized to ensure consistent process performance. To achieve this control, the output wavelength and/or spectral bandwidth of the laser must be well characterized, and remain stable and precisely controlled over a wide range of operating conditions.

A typical measurement technique directs a portion of the laser beam through an etalon to create an optical fringe pattern on the surface of a sensor. The spacing of the fringe pattern can be related to wavelength and the thickness of each fringe can be related to spectral bandwidth. Both fringe spacing and thickness can be detected with a sensor such as a multi-element photodiode array (PDA), and the resulting measurements can be input to a wavelength/bandwidth feedback control system.

In more detail, an etalon, e.g. a Fabry Perot interferometer having a plano configuration, is an optical device consisting of two flat surfaces, held parallel to high precision, typically to within a small fraction of the laser wavelength. These surfaces may be, for example, opposed flat sides of a transparent optical element, in which case the optic is referred to as a "solid etalon". In another type of construction, the etalon could be formed by the adjacent surfaces of two transparent optical elements, separated by a spacer or spacers with parallel faces. This assembly is often referred to as an "air-spaced etalon", although the gap between the two elements could be filled with any transparent medium.

Special coatings can be applied to the surfaces of the etalon to enhance their reflectivity at a particular wavelength, or range of wavelengths. This creates an optical cavity, in which constructive and destructive interference of light passing through the cavity can occur. The nature of this interference will depend, among other factors, upon the wavelength, spectrum, and direction of the light, the flatness, parallelism and reflectivity of the optical surfaces, and the optical path length between the two cavity surfaces. The result of the interference is that cones of light are formed by the etalon and directed to the PDA surface where the light generates the optical fringe pattern.

As the discussion above suggests, many laser systems now include an onboard spectrometer, sometimes referred to as a "wavemeter" for measuring bandwidth and/or center wavelength. Requirements for tighter wavelength and bandwidth control have increased the need to initially provide and thereafter maintain a close-tolerance alignment between the etalon and detector in the laser's onboard spectrometer. The initial alignment may, for example, be altered during shipment or installation of the laser, adversely affecting the precision of the wavemeter. Typically, the onboard wavemeter module is sealed, and in some cases purged. Thus, alignment inspections techniques that require physical access to the internal wavemeter components can be expensive and time-consuming.

With the above considerations in mind, Applicants disclose methods and apparatus for aligning an etalon with a photodiode array. In addition, methods and apparatus for inspecting an alignment between an etalon and a photodiode array are described.

SUMMARY OF THE INVENTION

In a first aspect of an embodiment of the invention, an apparatus for measuring a characteristic, e.g. spectral bandwidth and/or center wavelength, of a light beam may comprise an etalon for generating an interference pattern having at least one light cone, an arrangement of detector elements, the arrangement receiving a portion of the light cone and producing a signal indicative of the characteristic; and an auxiliary detector positioned to receive a portion of the light cone and produce a signal indicative of an alignment between the etalon and the linear arrangement. In one embodiment, the arrangement of detector elements may comprise an array of photodiodes and in a particular embodiment the arrangement of detector elements may comprise a linear array. For this aspect, the etalon may be a Fabry Perot interferometer having a piano configuration and for some applications, the auxiliary detector may be a single photodiode.

In another aspect of an embodiment, a method for aligning an etalon relative to an arrangement of detector elements may comprise the steps of positioning an auxiliary detector at a known location; illuminating the etalon to generate a light cone; adjusting a wavelength of light illuminating the etalon to illuminate the auxiliary detector and at least two locations on the arrangement of detector elements; and using the positions of the two illuminated locations on the arrangement of detector elements and the position of the auxiliary detector to determine an alignment between the etalon and the arrangement of detector elements. In one implementation, the arrangement of detector elements and the auxiliary detector may be located in a plane and the using step may comprises the sub-step of calculating a position of a light cone center in the plane. In a particular implementation of the method, the step of adjusting a wavelength of light illuminating the etalon may be accomplished by scanning the wavelength over a range of wavelengths.

For another aspect, a method for testing whether an etalon remains in a pre-selected alignment relative to an arrangement of detector elements, may comprise the steps of illuminating an auxiliary detector with a portion of a light cone generated by the etalon while the etalon and arrangement of detector elements are in the pre-selected alignment and determining the positions of at least two locations on the arrangement of detector elements that are illuminated simultaneously with the auxiliary detector. Thereafter, the alignment may be tested to investigate whether the pre-selected alignment is still present by illuminating the auxiliary detector with a portion of a light cone generated by the etalon; and comparing locations on the arrangement of detector elements that are illuminated simultaneously with the auxiliary detector to the locations found in the determining step.

DETAILED DESCRIPTION OF PREFERRED EMBODIMENTS

Figure 1:
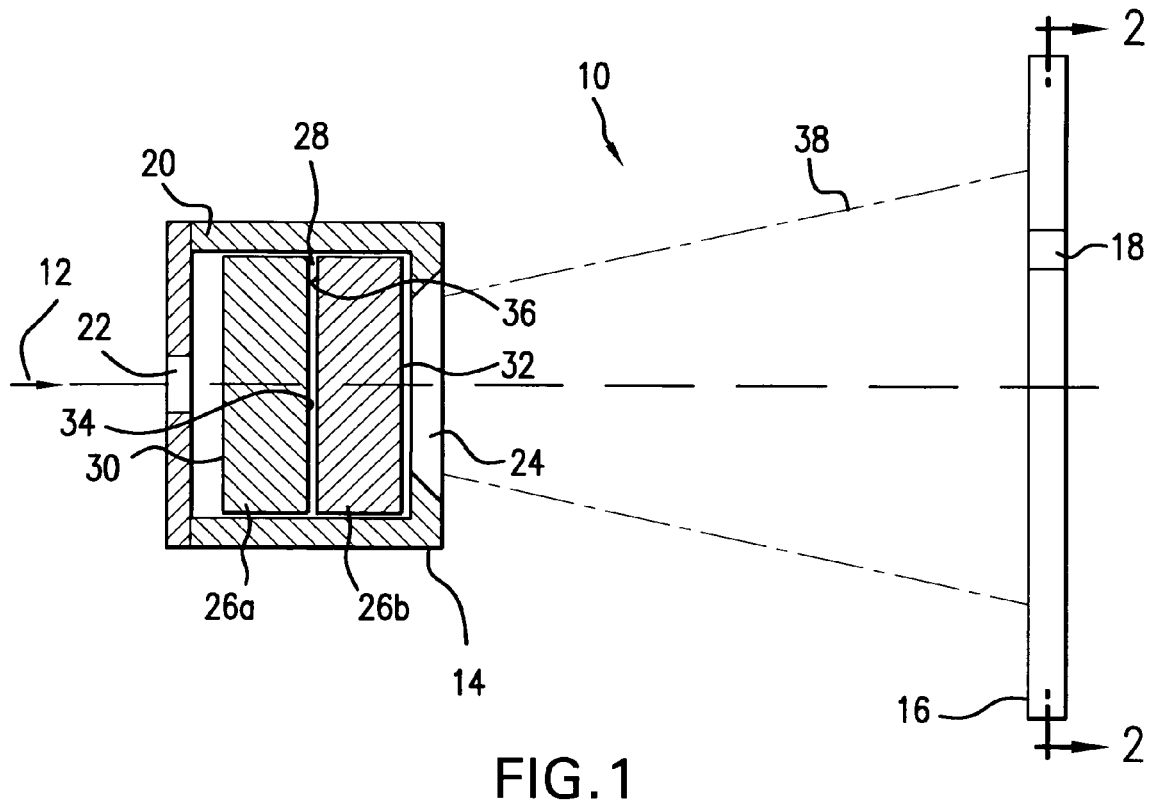
FIG. 1 shows a simplified, schematic sectional view of portion of a wavemeter having an etalon, a PDA and an auxiliary alignment photodiode.

Referring initially to FIG. 1, an apparatus is shown and generally designated 10 for measuring a characteristic, e.g. spectral bandwidth and/or center wavelength, of a light beam 12. As shown, the apparatus 10 includes an etalon assembly 14 positioned on the beam path of the light beam 12 and an arrangement of detector elements, which can be for example a PDA 16, and an auxiliary alignment photodiode 18.

In more detail, the etalon assembly 14 may include an etalon housing 20 having an optical input window 22 and exit window 24. Two flat etalon plates 26a,b may be spaced apart and rigidly mounted, e.g. bonded using RTV adhesive, to the housing 20 to create an etalon cavity 28 between the plates. For the etalon assembly 14, surface 30 of plate 26a and surface 32 of plate 26b are typically coated with an anti-reflection coating and surface 34 of plate 26a and surface 36 of plate 26b are typically coated with a highly reflective coating. More details regarding suitable plate materials and suitable coatings and coating methods may be found in co-pending U.S. patent applications Ser. No. 11/260,929, entitled BLISTER RESISTANT OPTICAL COATING, filed on Oct. 27, 2005, which has been previously been incorporated by reference herein.

For the apparatus 10, the PDA 16 may be an elongated array, e.g. linear array (linear PDA), having many more pixels in one dimension than the other, with the short dimension having as little as one pixel. For example, the PDA may be an integrated circuit chip comprising 1024 separate photodiode integrated circuits and an associated sample and hold readout circuit. For example, but not limitation, the photodiodes may be on a 25 micrometer pitch for a total length of 25.6 mm (about one inch) with each photodiode being about 500 micrometers long. Photodiode arrays such as this are available from several sources. Depending on the application, a suitable PDA may be a Model S3903-1024Q by Hamamatsu, which may be read on a FIFO basis to allow all 1024 pixels to be read at rates of 4,000 Hz or greater. The PDA may, for example, be designed for 2.times.10.sup.6 pixel/sec operation and may be operated in an over-clocked state.

Figure 2:
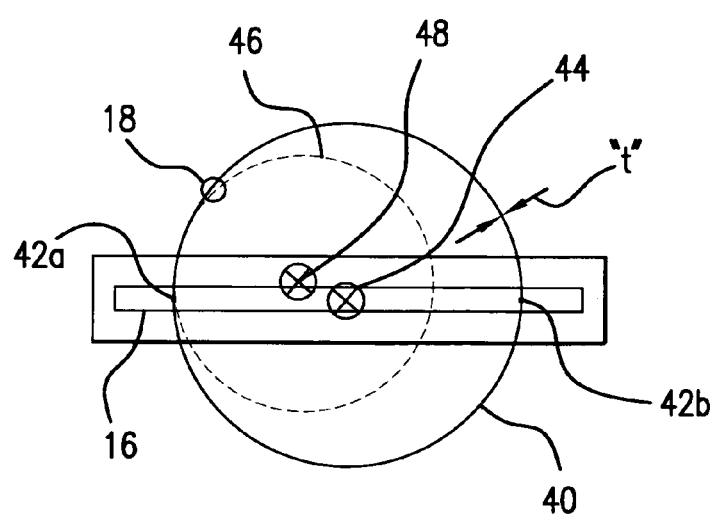
FIG. 2 shows a sectional view as seen along line 2-2 in FIG. 1 showing the PDA, auxiliary photodiode, an "aligned" fringe pattern (solid circle) and a "non-aligned" fringe pattern (dashed circle)

The operation of the apparatus 10 as an onboard spectrometer for a laser source can best be understood with cross-reference to FIGS. 1 and 2. As shown there, a light beam 12, e.g. a pulsed, laser light beam, which may be for example, generated using a beam splitter, e.g. pickoff or partially reflecting optic, operating on a laser output, e.g. excimer gas discharge laser output is input into the apparatus 10. More specifically, FIG. 1 shows that the beam 12 is made incident upon the etalon plate 26a through window 22 creating an interference pattern that exits the etalon assembly 14 through window 24. The interference pattern includes at least one light cone 38 which is directed at and illuminates portions of the surface of the PDA 16. In particular, as shown in FIG. 2, the intersection of the light cone 38 with the plane of the PDA 16 creates a substantially circular light pattern 40 which illuminates two locations, e.g. locations 42a, 42b, on the PDA 16. Illuminated pixels corresponding to the locations 42a,b may then be used to calculate a spectral bandwidth and/or central wavelength for the beam 12. In particular, the diameter of the circular light pattern 40 relates to the central wavelength and the thickness, "t", relates to the spectral bandwidth.

The operation of the apparatus 10 to verify an alignment between the etalon 14 and PDA 16 can best be understood with cross reference to FIGS. 1 and 2. As shown there, a light beam 12, which may be for example, generated using wavelength tunable light source, e.g. tunable laser source, is made incident upon the etalon plate 26a through window 22 creating an interference pattern that exits the etalon assembly 14 through window 24. The interference pattern includes at least one light cone 38 which is directed at and illuminates portions of the surface of the PDA 16. In particular, as shown in FIG. 2, the intersection of the light cone 38 with the plane of the PDA 16 creates a substantially circular light pattern 40 which illuminates two locations, e.g. locations 42a, 42b, on the PDA 16. The diameter of the circular light pattern 40 is dependent on the central wavelength of the beam 12. Thus, the wavelength of the light beam 12 illuminating the etalon may be adjusted, e.g. scanned, to expand or contract the diameter of the circular light pattern 40. In particular, the wavelength may be adjusted until the diameter of the light pattern 40 is sized to illuminate the auxiliary alignment photodiode 18. At this wavelength, the illuminated locations 42a,b and the location of the auxiliary photodiode 18 can be used to geometrically define the "circle" of the circular light pattern 40 and the circle's center 44. The location of the circles center, in turn, can be used to determine an alignment of the etalon 14 and PDA 16. For example, circular light pattern 46 and corresponding circle center 48 represents a state of misalignment between the etalon 14 and PDA.

Figure 3:
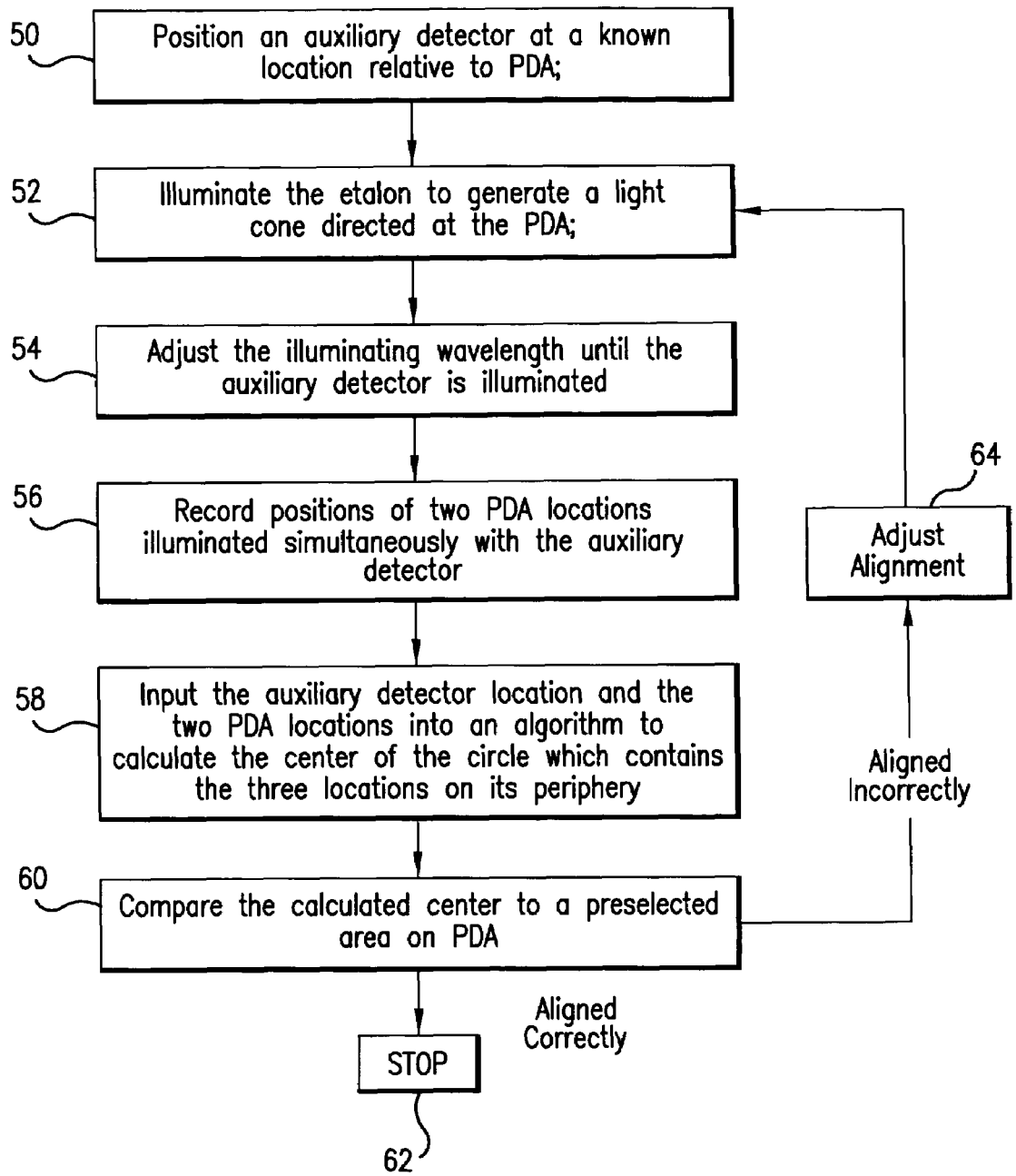
FIG. 3 shows a logic flow diagram illustrating a method for measuring an alignment of an etalon relative to PDA.

FIG. 3 illustrates a procedure for aligning an etalon relative to a PDA. As shown, the procedure begins by positioning an auxiliary detector at a known location (box 50) which is typically in the plane of the PDA and separated therefrom by a distance sufficient to obtain reasonable accuracy in calculating the circle center as described above. Next, the etalon may be illuminated to generate a light cone (box 52) and the wavelength of the light illuminating the etalon may be adjusted until the auxiliary detector is illuminated (box 54). With the auxiliary detector illuminated, the illuminated locations on the PDA are recorded (box 56). This data can then be input into an algorithm, e.g. using a computer processor, to calculate the center of a circle which contains the three locations on its periphery (box 58). The calculated center can then be used to determine whether a suitable alignment is present. For example, in one implementation, an alignment is considered suitable if the center location corresponds to an area of the PDA near the center of the PDA (box 60). If the alignment is correct (box 62) the procedure is completed. On the other hand, as FIG. 3 shows, if the alignment is incorrect, the alignment can be adjusted (box 64) and steps 52, 54, 56, 58, 60 (and if necessary box 64) are continued, in sequence, until a correct alignment is obtained.

Figure 4:
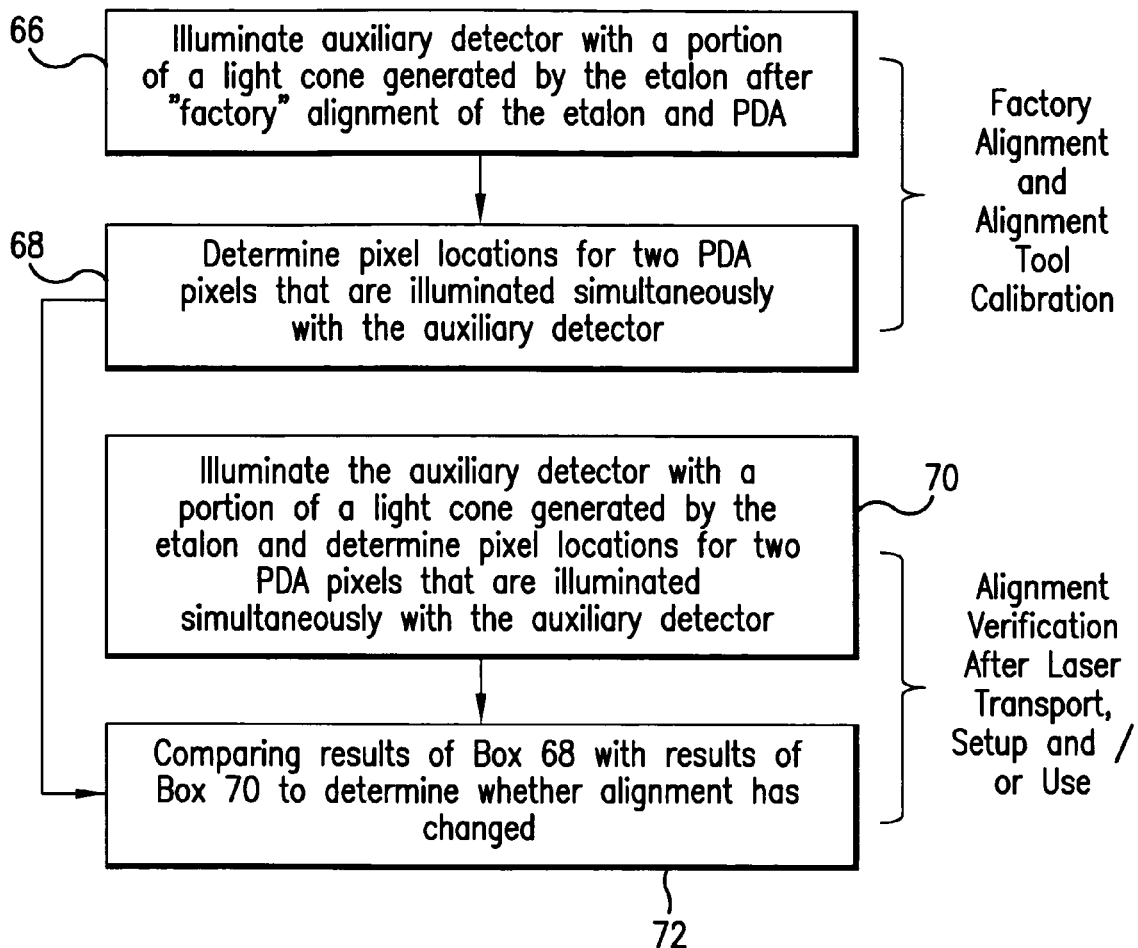
FIG. 4 shows a logic flow diagram illustrating a method for testing whether an etalon remains in a pre-selected alignment relative to PDA.

FIG. 4 illustrates a procedure for testing whether an etalon/PDA alignment has changed from an initial setting, e.g. the factory setting (i.e. the initial alignment setting established during fabrication of the apparatus 10). As shown, the procedure begins by illuminating the auxiliary detector with a portion of a light cone generated by the etalon sometime after an initial alignment, e.g. immediately after "factory" alignment of the etalon and PDA (box 66). This can be done, for example, by scanning the wavelength of an input light beam until the auxiliary detector is illuminated. Note: the position of the auxiliary detector relative to the PDA does not necessarily need to be known for this procedure. Next, with the auxiliary detector illuminated, the illuminated locations on the PDA are recorded (box 68). At this point, the alignment tool is calibrated and can be subsequently used, e.g. in the field, e.g. after laser transport, setup or use, to verify that the initial alignment is still present. In particular, this can be accomplished by illuminating the auxiliary detector with a portion of a light cone generated by the etalon, e.g. by scanning the wavelength of an input light beam until the auxiliary detector is illuminated (Box 70), and comparing (Box 72) the illuminated PDA pixels with the locations recorded in Box 68.

While the particular aspects of embodiment(s) described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present invention is solely and completely limited by only the appended Claims and nothing beyond the recitations of the appended Claims. Reference to an element in such Claims in the singular is not intended to mean nor shall it mean in interpreting such Claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present Claims. Any term used in the Specification and/or in the Claims and expressly given a meaning in the Specification and/or Claims in the present Application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this Application, for it to be encompassed by the present Claims. No element, component, or method step in the present disclosure is intended to be dedicated to the public regardless of whether the element, component, or method step is explicitly recited in the Claims. No claim element in the appended Claims is to be construed under the provisions of 35 U.S.C. §112, sixth paragraph, unless the element is expressly recited using the phrase "means for" or, in the case of a method claim, the element is recited as a "step" instead of an "act".

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended Claims are intended in scope and meaning to cover not only the disclosed aspects of embodiments of the present invention(s) but also such equivalents and other modifications and changes that would be apparent to those skilled in the art.

I claim:

1. An apparatus for measuring a characteristic of a light beam, the apparatus comprising:
   an etalon for generating an interference pattern having at least one light cone,
   an arrangement of detector elements receiving a portion of the light cone and producing a signal indicative of the characteristic; and
   an auxiliary detector positioned to receive a portion of the light cone and produce a signal indicative of an alignment between the etalon and the arrangement of detector elements.

2. An apparatus as recited in claim 1 wherein the arrangement of detector elements comprises an array of photodiodes.

3. An apparatus as recited in claim 1 wherein the arrangement of detector elements comprises a linear array.

4. An apparatus as recited in claim 1 wherein the etalon is a Fabry Perot interferometer having a plano configuration.

5. An apparatus as recited in claim 1 wherein the auxiliary detector is a single photodiode.

6. An apparatus as recited in claim 1 wherein the characteristic is spectral bandwidth.

7. A method for measuring an alignment of an etalon relative to an arrangement of detector elements, the method comprising the steps of:
   positioning an auxiliary detector at a known location;
   illuminating the etalon to generate a light cone;
   adjusting a wavelength of light illuminating the etalon to illuminate the auxiliary detector and at least two locations on the arrangement of detector elements; and
   using the positions of the two illuminated locations on the arrangement of detector elements and the position of the illuminated auxiliary detector to determine an alignment between the etalon and the arrangement of detector elements.

8. A method as recited in claim 7 wherein the arrangement of detector elements and the auxiliary detector are located in a plane and the using step comprises the sub-step of calculating a position of a light cone center in the plane.

9. A method as recited in claim 7 wherein the arrangement of detector elements comprises an array of photodiodes.

10. A method as recited in claim 7 wherein the arrangement of detector elements comprises a linear array.

11. A method as recited in claim 7 wherein the etalon is a Fabry Perot interferometer having a plano configuration.

12. A method as recited in claim 7 wherein the auxiliary detector is a single photodiode.

13. A method as recited in claim 7 wherein the step of adjusting a wavelength of light illuminating the etalon is accomplished by scanning the wavelength over a range of wavelengths.

14. A method for testing whether an etalon remains in a pre-selected alignment relative to an arrangement of detector elements comprising the steps of:
  illuminating an auxiliary detector with a portion of a light cone generated by the etalon while the etalon and arrangement of detector elements are in the pre-selected alignment;
  determining the positions of at least two locations on the arrangement of detector elements that are illuminated simultaneously with the auxiliary detector; and thereafter
  testing whether the pre-selected alignment is still present by:
    illuminating the auxiliary detector with a portion of a light cone generated by the etalon; and
    comparing locations on the arrangement of detector elements that are illuminated simultaneously with the auxiliary detector to the locations found in the determining step.

15. A method as recited in claim 14 wherein the step of illuminating the auxiliary detector is accomplished by adjusting a wavelength of light incident upon the etalon.

16. A method as recited in claim 14 wherein the arrangement of detector elements and the auxiliary detector are located in a plane and the using step comprises the sub-step of calculating a position of a light cone center in the plane.

17. A method as recited in claim 14 wherein the arrangement of detector elements comprises an array of photodiodes.

18. A method as recited in claim 14 wherein the arrangement of detector elements comprises a linear array.

19. A method as recited in claim 14 wherein the etalon is a Fabry Perot interferometer having a plano configuration.

20. A method as recited in claim 14 wherein the auxiliary detector is a single photodiode.

* * * * *